United States Patent
Bertetti et al.

[11] Patent Number: 6,095,291
[45] Date of Patent: Aug. 1, 2000

[54] BEARING-AND-BRAKE-MEMBER ASSEMBLY FOR MOTOR VEHICLES, PROVIDED WITH AN INTERMEDIATE CONNECTION ELEMENT BETWEEN THE BEARING AND THE BRAKE MEMBER

[75] Inventors: Paolo Bertetti, Turin; Luca Morero, Cantalupa, both of Italy

[73] Assignee: SKF Industrie S.p.A., Turin, Italy

[21] Appl. No.: 08/854,274

[22] Filed: May 9, 1997

[30] Foreign Application Priority Data

May 10, 1996 [IT] Italy .................................. TO96A0387

[51] Int. Cl.[7] .............................. B60T 1/06; F16D 65/12
[52] U.S. Cl. ................. 188/18 A; 188/18 R; 188/218 R; 188/264 AA; 188/264 R; 188/218 A; 188/218 XL; 301/6.8
[58] Field of Search ............................ 188/218 A, 18 A, 188/218 R, 17, 264 R, 18 R, 71.5, 58, 59, 206 R, 205 R, 218 XL, 264 AA, 264 A; 301/105.1, 6.1, 6.8, 6.7, 6.2, 6.6; 180/370, 254, 259; 280/105; 384/537, 585, 539, 589, 544, 512; 192/70.19, 70.2; 403/348, 405.1, 13; 464/139, 178, 906

[56] References Cited

U.S. PATENT DOCUMENTS

| | | | |
|---|---|---|---|
| 2,014,865 | 9/1935 | Schmidt | 188/218 R |
| 2,123,614 | 7/1938 | Sinclair . | |
| 2,215,420 | 9/1940 | Eksergian | 188/264 A |
| 2,219,156 | 10/1940 | Yankee | 301/6.3 |
| 2,558,297 | 6/1951 | Horn | 188/218 R |
| 2,998,870 | 9/1961 | Herman et al. | 188/264 R |
| 3,403,760 | 10/1968 | Caskey | 188/264 AA |
| 3,630,323 | 12/1971 | Hickle | 301/6.8 |
| 4,002,227 | 1/1977 | Simon . | |
| 4,281,745 | 8/1981 | Wirth | 188/218 XL |
| 4,437,536 | 3/1984 | Colanzi et al. | 301/126 |
| 4,456,308 | 6/1984 | Opel et al. | 188/18 R |
| 4,792,020 | 12/1988 | Okumura et al. | 301/6.8 |
| 4,913,266 | 4/1990 | Russell et al. | 188/218 XL |
| 5,409,256 | 4/1995 | Gordon et al. | 403/349 |
| 5,536,075 | 7/1996 | Bertetti | 301/105.1 |
| 5,649,242 | 7/1997 | O'Brien et al. . | |
| 5,782,566 | 7/1998 | Bertetti . | |

FOREIGN PATENT DOCUMENTS

| | | | |
|---|---|---|---|
| 0 309 174 | 3/1989 | European Pat. Off. . | |
| 2919411 | 11/1980 | Germany | 188/18 A |
| 3605806 | 9/1987 | Germany | 188/218 XL |
| 488548 | 12/1953 | Italy | 188/264 A |
| 61-48622 | 3/1986 | Japan | 188/264 A |

*Primary Examiner*—Douglas C. Butler
*Attorney, Agent, or Firm*—Burns, Doane, Swecker & Mathis, L.L.P.

[57] ABSTRACT

A disc or drum brake member is usually connected to the flange of the bearing of a motor vehicle wheel; possible manufacturing errors in the flange of the bearing, and/or the brake member cause, on tightening the wheel to the flange, deformations in the bearing tracks and the active surfaces of the brake member; to avoid this, an elastically-yielding connection element is interposed, connected to the bearing on one side and the brake member on the other side, and constituted by a bell of sheet metal, dimensioned to present a high torsional rigidity associated with a limited axial rigidity to absorb and neutralise the tensions produced on tightening the screws holding the wheel to the flange of the bearing, even in the presence of manufacturing errors on the corresponding facing surfaces of the parts to be joined.

11 Claims, 2 Drawing Sheets

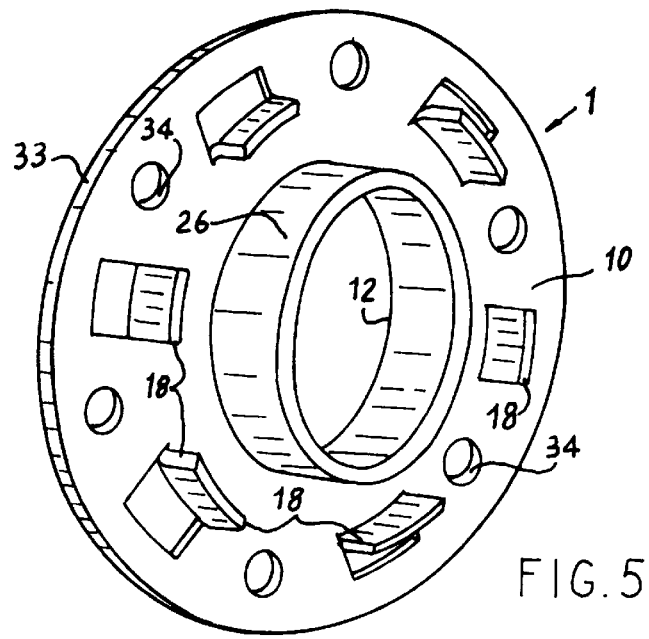
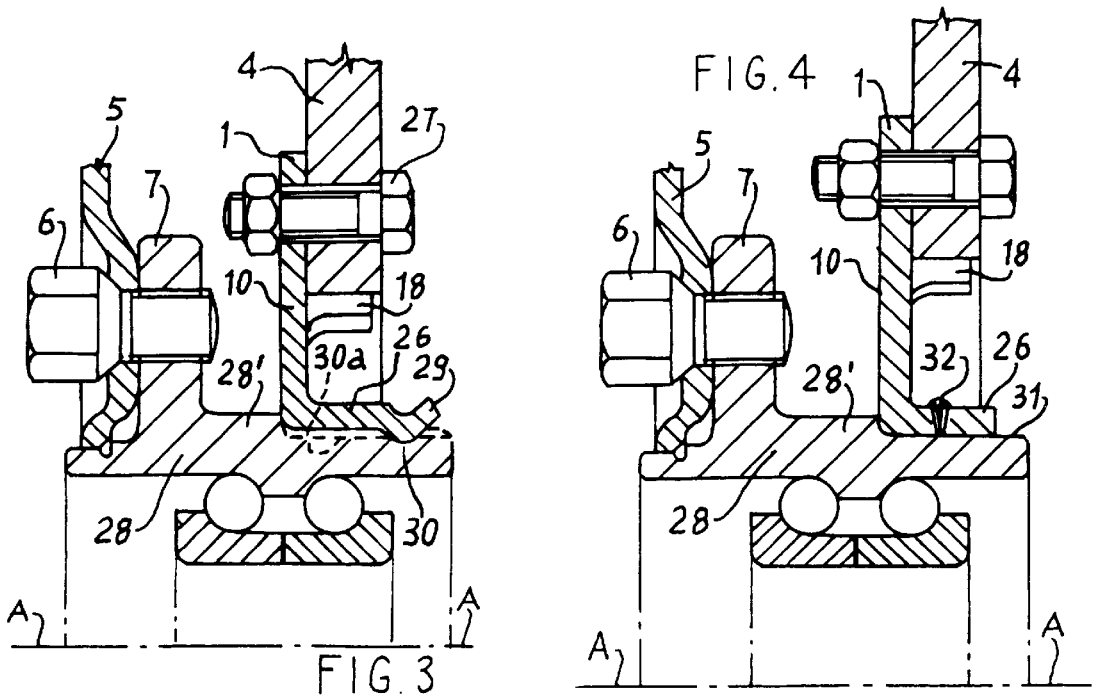

BEARING-AND-BRAKE-MEMBER ASSEMBLY FOR MOTOR VEHICLES, PROVIDED WITH AN INTERMEDIATE CONNECTION ELEMENT BETWEEN THE BEARING AND THE BRAKE MEMBER

BACKGROUND OF THE INVENTION

The present invention concerns an improved bearing-and-brake-member assembly for a motor vehicle, provided with an intermediate connection element between the bearing and the brake member, and more particularly it concerns the mounting of a brake member such as a disc or drum on a rotating ring of a bearing of a driving wheel or a free wheel of a motor vehicle.

It is known that disc or drum brake members for motor vehicles are mounted directly on the rotating ring of the wheel bearing, which is provided with a radial flange to which the disc or drum is connected; in particular, the disc, preferably associated with a driving wheel, is mounted in contact with a flange of the inner ring of the bearing, and fixed to the wheel by means of bolts screwed to the flange, or nuts screwed to captive bolts fixed to the flange; similarly, the drum, usually associated with a free wheel, is connected to the flange of a rotating outer ring of the bearing, fixed to the wheel by bolts screwed to the flange, or nuts screwed to captive bolts fixed to the flange.

Due to working tolerances in the manufacture of the wheel, the flange and the brake member, it is not possible to avoid irregularities in the flatness of the facing surfaces of the parts to be joined together. Such flatness errors give rise on tightening the bolts to deformations in the bearing tracks and the active surfaces of the brake members (on which the brake pads or shoes act) in the form of ovalization, undulations and the formation of lobes. These disadvantages give rise to vibrations, braking noise and irregular wear of the active surfaces of the brake members, in addition reducing the resistance of the bearing to fatigue.

A known solution to these disadvantages is to use components (wheels, braking members, bearing flanges) manufactured to high precision or, alternatively, to use a bearing having a flange of great thickness and rigidity so as to resist the deformations caused by tightening the wheel-fixing screws.

However, these solutions are disadvantageous in terms of their effect on the cost and weight of the assembly.

SUMMARY OF THE INVENTION

The aim of the present invention is to provide a bearing-and-brake-member assembly free from the disadvantages described above, and in which tightening the wheel-fixing nuts does not give rise to tensions and deformations in the rolling tracks of the bearings, and in which deformations of the active surfaces of the brake members, which are mounted with the wheel on the bearing itself, are minimised.

Therefore, in accordance with the present invention, there is provided an improved bearing-and-brake-member assembly for a motor vehicle wheel, in which at least one ring of the bearing has a radial flange to receive a wheel and to connect the brake member with the bearing. The assembly includes an intermediate connection element between the bearing and the brake member. The connection element comprises an annular metal plate fixed to the flanged ring of the bearing and supporting the brake member. The metal plate is dimensioned to have high torsional rigidity together with limited axial rigidity in order to absorb deformations created in the flange on tightening the wheel.

BRIEF DESCRIPTION OF THE DRAWINGS

This and other characteristics of the invention will become clearer from the following description of a preferred embodiment, given by way of non-limitative examples, with reference to the accompanying drawings in which:

FIG. 3 shows one kind of mounting of the connection element to the outer ring of the bearing;

FIG. 4 shows a different kind of mounting for the connection element of FIG. 3;

FIG. 5 is a perspective view of the connection element used in FIGS. 3 and 4;

DETAILED DESCRIPTION OF THE INVENTION

Figure 1:
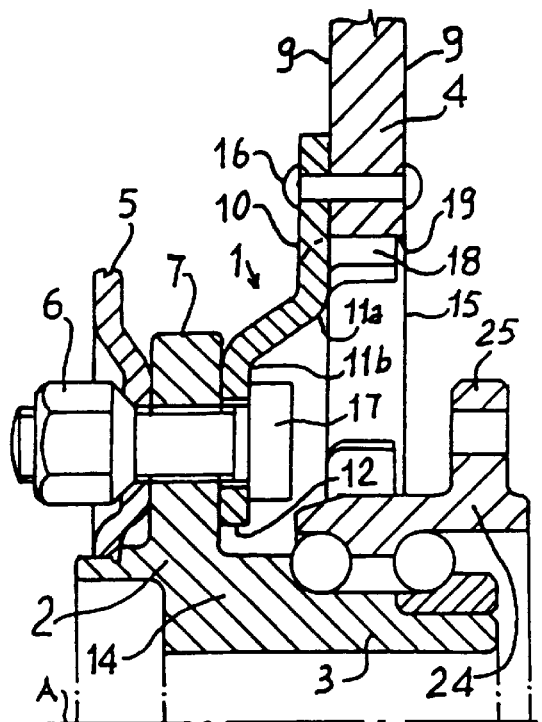
FIG. 1 shows an example of mounting the brake disc using an intermediate connection element, according to the invention.

With reference to FIGS. 1 to 4 and 6 to 7, a connection element 1 is interposed between a ring 2 of a bearing 3 and a brake member 4 for the wheel of a motor vehicle (not illustrated), a rim 5 of which is fixed by bolts 6 to a flange 7 of the ring 2. The connection element 1 is constituted by a substantially annular plate 10 of pressed sheet metal. The connection element is used, according to the invention, to absorb the stresses and possible deformations created on respective active surfaces 9 of the brake members 4 by the tightening of the screws 6. Upon mounting and tightening the wheel 5 on the flange 7 of the bearing with the screws 6 deformations are caused due to irregularities in the flatness of the facing surfaces of the wheel, the flange and the brake member.

Figure 2:
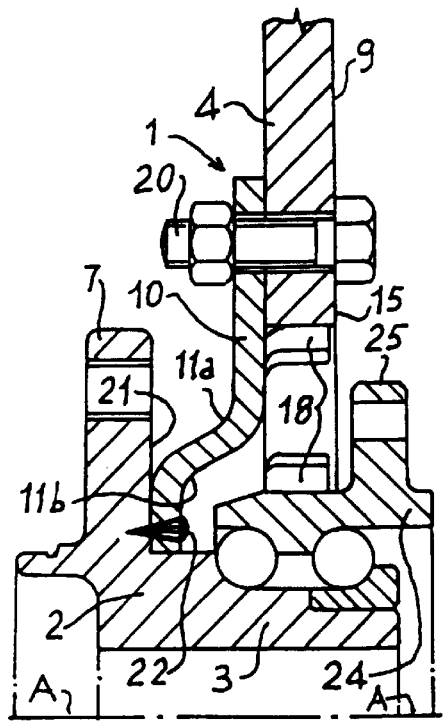
FIG. 2 shows a different way of fixing the connection element of FIG. 1 to the flange of the bearing and the brake disc.
Figure 7:
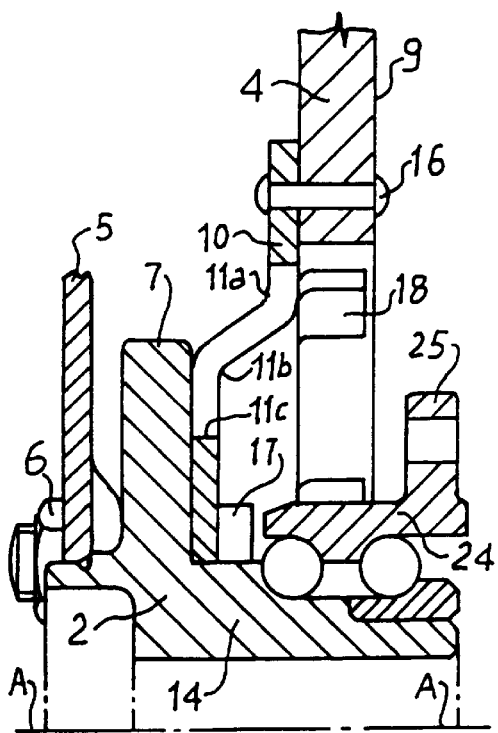
FIG. 7 shows the mounting of FIG. 1 seen on a different section plane, along a radial slot of the connection element.

A first embodiment of the connection element 1, illustrated in FIGS. 1 and 2, consists in forming the sheet metal plate 10 into a shape, seen in diametral section, having two adjacent and opposite folds 11a and 11b forming an approximate Z-shape. The connection element may have slot 11c (FIG. 7) which extend radially to ensure a high torsional rigidity and strength and, at the same time, a limited axial rigidity (in the sense that it is much lower than the torsional rigidity), to ensure the efficient elastic absorption of the axial deformations produced on tightening the bolts for attaching the wheel 5 to the flange 7.

In particular, as shown in FIG. 1, the plate 10 has a central hole 12 to allow the body 14 of the bearing 3 to pass through; the plate 10 is joined to a brake disc 15 by a fixing system constituted by a circle of cold-upset rivets 16 lying in a circle close to the edge of the plate 10.

The plate 10 is also connected to the flange 7 by a series of captive bolts 17 inserted in corresponding holes disposed in an inner ring close to the edge of the central hole 12; these same bolts also serve to mount the wheel 5; in this case, the bolts 17 are held captive on the flange 7 after having mounted the plate 10 in place; after having assembled the assembly comprising the brake disc 15, the plate 10, and the bearing ring 2, the disc 15 is worked to make the two active surfaces 9 substantially coplanar and centred with respect to the axis of rotation A-A of the bearing.

To facilitate the mounting and initial centering of the brake disc 15 on the connection element 1, the plate 10 (FIG. 5) is provided with tabs 18 blanked and folded axially at approximately 90°, and for engaging with an internal cylindrical surface 19 (FIG. 1) of the disc 15.

FIG. 2 shows a variation of the attachment of the plate 10 respectively to the brake disc 15 and the flange 7 of the bearing 3; the disc 15 is attached to the plate 10 by bolts 20, while the plate 10 is welded at its inner edge to a side 21 of the flange 7, using spot welding or a continuous weld bead 22 effected, for example, using a laser process.

The embodiments shown in FIGS. 1 and 2 are typically used on driving wheels in which the ring 2 of the bearing 3 is the inner ring, which is connected to the spindle of a constant-velocity universal joint. The outer ring 24 of the bearing 3 is in turn attached by means of a second flange 25 to a support, not shown, of the vehicle suspension.

FIGS. 3 and 4 show, according to the invention, an application of the connection element 1, adapted to join a brake member 4 to the bearing of a free wheel; in these applications, the element 1 has a slightly different shape from that shown in FIGS. 1 and 2; The element 1 is constituted by an annular, flat plate 10 integral with a central, axially extending cylindrical sleeve 26 which is formed together with the plate 10 in a pressing operation, known in the related art.

The plate 10 is again connected to the brake disc 15 by bolts 27, but other attachment systems may be used which may be better suited to the particular conditions of use. The plate 10 is mounted on the body 281 of a ring 28 of the bearing 3 (FIG. 3), spaced from the flange 7; the sleeve 26 is joined to the ring 28 by means of forced coupling or knurling and is then fixed axially by means of swaging or rolling its outer edge 29 into a circumferential groove 30 of the ring 28.

In particular, to make the transmission of torque between the connection element 1 and the bearing 3 more secure, the sleeve 26 is joined for rotation with the ring 28 by a splined coupling 30*a*, represented in broken outline in FIG. 3 and constituted by two meshing sets of axial teeth formed respectively inside the sleeve 26 and outside the ring 28.

A different way of mounting the element 1 to the ring 28 is shown in FIG. 4: the sleeve 26 is interference fitted on a seat 31 of the ring 28 and spot welded by laser to form weld spots 32 disposed circumferentially around the outer cylindrical surface of the sleeve itself.

FIG. 5 shows the connection element 1 according to the invention in the form used in FIGS. 3 and 4. In FIG. 5 it can be seen that the tabs 18 of the plate 10 are disposed circumferentially, concentric with the central hole 12, in a position substantially between the hole 12 and the outer edge 33. The tabs 18 are angularly equally spaced, and are intercalated between the holes 34 used for the attachment of the plate 10 to the brake disc 15.

Figure 6:
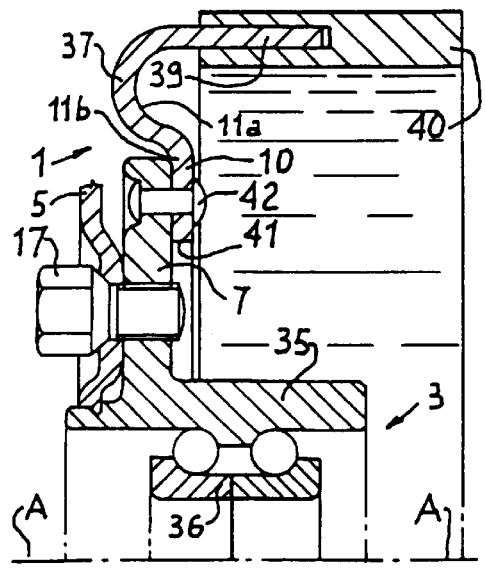
FIG. 6 shows a further embodiment of the connection element according to the invention, for a drum brake.

FIG. 6 shows an application of the connection element 1 with a drum brake; this use is typical of a non-driven wheel, usually the rear wheel of a motor vehicle, and shows the element 1 mounted on the outer ring 35 of the bearing 3, while the inner ring 36 is ordinarily mounted on the spindle of the hub, not shown.

In this application, the connection element 1 has a plate 10 of pressed sheet metal shaped with a wide semicircular portion 37, and possibly having radial slots for improving the capacity for absorbing the deformations created in the flange 7 by tightening the bolts 17 of the rim of the wheel 5; on one side the portion 37 extends axially with a cylindrical part 39 embedded in the thickness of the drum 40; on the opposite side, the plate 10 is formed with a flat annular zone 41 which can be fixed to the flange 7 by rivets 42.

What is claimed is:

1. An assembly for a wheel of a motor vehicle comprising a bearing and a brake member, the bearing including an inner bearing ring and an outer bearing ring, one of said bearing rings being integrally provided with a radial flange to receive a rim of the wheel, said one bearing ring and said radial flange being formed in one piece as a unitary structure, and including an intermediate connection element between the bearing and the brake member, said connection element including an annular metal plate fixed to said one bearing ring and supporting said brake member radially spaced apart from said bearing ring so that said metal plate is the sole connection between said brake member and said one bearing ring, said annular plate being carried on an axially extending cylindrical central sleeve formed together with said plate, said plate being provided with a plurality of axially extending projection tabs equally spaced in a circle and cooperating with the brake member to facilitate centering of said brake member on said connection element.

2. An assembly according to claim 1 wherein said connection element is fixed to said one bearing ring by swaging an edge of said sleeve into a circular groove of said outer bearing ring.

3. An assembly according to claim 2, wherein said connection element is joined to said one bearing ring by a splined coupling, suitable to transmit a couple between said connection element and said one bearing ring.

4. An assembly according to claim 1, wherein said connection element is joined to the one bearing ring by welding said sleeve to said one bearing ring at a position spaced from said flange.

5. An assembly according to claim 1, wherein said one bearing ring is the outer bearing ring.

6. An assembly for a wheel of a motor vehicle, comprising a brake member, a bearing and an intermediate connection element, said bearing having an inner bearing ring and an outer bearing ring with a plurality of rolling elements located between the inner and outer bearing rings, one of the bearing rings including an integrally formed radial flange so that said one bearing ring and said radial flange are formed in one piece as a unitary structure, said connection element being located between the flange of the one bearing ring and the brake member, said connection element including an annular metal plate fixed to said flange of said one bearing ring and supporting said brake member, with said metal plate being the sole connection between said brake member and said one bearing ring, said annular plate having, in diametrical section, two opposite folds, said two folds including first and second folds, said first fold being located radially inwardly of the second fold, said annular plate being provided with a plurality of radially extending slots having a radial extent greater than the distance between the two opposite folds so that said slots extend radially inwardly beyond the first fold and radially outwardly beyond the second fold and so that said metal plate possesses a high torsional rigidity combined with a limited axial rigidity to absorb deformations created in said flange upon tightening said wheel.

7. An assembly according to claim 6, wherein said annular plate is formed from pressed sheet metal.

8. An assembly according to claim 6, wherein said annular plate is provided with a plurality of axially extending and circumferentially oriented projection tabs for cooperating with the brake member to facilitate centering of said brake member on said connection element.

9. An assembly according to claim 6, wherein said connection element is joined to said flange by captive screws.

10. An assembly according to claim 6, wherein said connection element is fixed securely to said flange by rivets.

11. An assembly according to claim 6, wherein said one bearing ring is the inner bearing ring.

* * * * *